US011310713B2

(12) United States Patent
Hu

(10) Patent No.: US 11,310,713 B2
(45) Date of Patent: Apr. 19, 2022

(54) COMMUNICATION METHOD TO GENERATE A SERVICE CONNECTION CONFIGURATION OF A BEARER NETWORK, NETWORK SERVER, AND COMPUTER-READABLE STORAGE MEDIUM

(71) Applicant: HUAWEI TECHNOLOGIES CO., LTD., Shenzhen (CN)

(72) Inventor: Yongjian Hu, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 217 days.

(21) Appl. No.: 16/692,709

(22) Filed: Nov. 22, 2019

(65) Prior Publication Data
US 2020/0092782 A1 Mar. 19, 2020

Related U.S. Application Data

(63) Continuation of application No. PCT/CN2018/090770, filed on Jun. 12, 2018.

(30) Foreign Application Priority Data

Jul. 12, 2017 (CN) .......................... 201710567903.1

(51) Int. Cl.
H04W 36/16 (2009.01)
H04W 76/12 (2018.01)
(Continued)

(52) U.S. Cl.
CPC .......... *H04W 36/165* (2013.01); *H04L 45/02* (2013.01); *H04W 8/005* (2013.01); *H04W 16/18* (2013.01);
(Continued)

(58) Field of Classification Search
CPC ............... H04W 36/165; H04W 76/12; H04W 36/00835; H04W 8/005; H04W 16/18;
(Continued)

(56) References Cited

U.S. PATENT DOCUMENTS

2009/0316629 A1* 12/2009 Singh .................... H04W 68/00
370/328
2010/0265867 A1* 10/2010 Becker ................ H04W 72/005
370/312
(Continued)

FOREIGN PATENT DOCUMENTS

| CN | 1719778 A | 1/2006 |
|---|---|---|
| CN | 1983971 A | 6/2007 |

(Continued)

OTHER PUBLICATIONS

Bernd Haberland et al.: Radio Base Stations in the Cloud, Bell Labs Technical Journal, vol. 18, No. 1, Jun. 30, 2013 (Jun. 30, 2013), pp. 129-152, XP055098994.
(Continued)

*Primary Examiner* — Jael M Ulysse
(74) *Attorney, Agent, or Firm* — Stein IP, LLC

(57) ABSTRACT

A communication method implemented by a network server, includes: obtaining, based on geographical location information of a plurality of base stations, a first connection relationship between the plurality of base stations; converting the first connection relationship into a second connection relationship based on a first correspondence between geographical location information of a base station and a network element ID of a network device connected to the base station, where the second connection relationship is a topological connection relationship between a plurality of network elements, and the plurality of base stations are respectively connected to the plurality of network elements in a one-to-one correspondence; and generating a service
(Continued)

connection configuration of the bearer network based on the second connection relationship. As a result, the service connection configuration of the bearer network can be automatically generated, thereby reducing an error rate and improving work efficiency.

15 Claims, 5 Drawing Sheets

(51) Int. Cl.
| | |
|---|---|
| H04W 36/00 | (2009.01) |
| H04L 45/02 | (2022.01) |
| H04W 8/00 | (2009.01) |
| H04W 16/18 | (2009.01) |
| H04W 24/02 | (2009.01) |
| H04W 36/22 | (2009.01) |
| H04W 40/24 | (2009.01) |
| H04W 64/00 | (2009.01) |

(52) U.S. Cl.
CPC ..... *H04W 24/02* (2013.01); *H04W 36/00835* (2018.08); *H04W 36/22* (2013.01); *H04W 40/246* (2013.01); *H04W 64/003* (2013.01); *H04W 76/12* (2018.02)

(58) Field of Classification Search
CPC ... H04W 24/02; H04W 36/22; H04W 40/246; H04W 64/003; H04W 92/20; H04W 64/00; H04L 45/02
See application file for complete search history.

(56) References Cited

U.S. PATENT DOCUMENTS

| | | | | |
|---|---|---|---|---|
| 2012/0238314 | A1* | 9/2012 | Cai | H04W 36/0083 |
| | | | | 455/524 |
| 2014/0056130 | A1* | 2/2014 | Grayson | H04W 76/12 |
| | | | | 370/230 |
| 2014/0064193 | A1* | 3/2014 | Yacobi | H04W 72/1215 |
| | | | | 370/329 |
| 2014/0120927 | A1* | 5/2014 | Liu | H04W 84/18 |
| | | | | 455/450 |
| 2014/0307556 | A1* | 10/2014 | Zhang | H04L 45/42 |
| | | | | 370/236 |
| 2014/0362730 | A1* | 12/2014 | Zhang | H04W 40/246 |
| | | | | 370/254 |
| 2015/0109954 | A1* | 4/2015 | Wilkinson | H04W 28/021 |
| | | | | 370/254 |
| 2015/0109955 | A1* | 4/2015 | Wilkinson | H04L 63/0272 |
| | | | | 370/254 |
| 2015/0109994 | A1* | 4/2015 | Wilkinson | H04W 40/246 |
| | | | | 370/328 |
| 2015/0110002 | A1* | 4/2015 | Wilkinson | H04W 40/02 |
| | | | | 370/329 |
| 2015/0124622 | A1* | 5/2015 | Kovvali | H04L 67/1006 |
| | | | | 370/236 |
| 2016/0065419 | A1* | 3/2016 | Szilagyi | G06F 11/3006 |
| | | | | 709/224 |
| 2016/0095032 | A1* | 3/2016 | Varney | H04W 24/02 |
| | | | | 370/329 |
| 2016/0192181 | A1 | 6/2016 | Choi et al. | |
| 2016/0294682 | A1* | 10/2016 | Bi | H04L 45/38 |
| 2017/0055269 | A1 | 2/2017 | Fujinami | |
| 2017/0273134 | A1* | 9/2017 | Cao | H04W 76/32 |
| 2019/0021126 | A1* | 1/2019 | Chun | H04W 36/0022 |

FOREIGN PATENT DOCUMENTS

| | | |
|---|---|---|
| CN | 100372300 C | 2/2008 |
| CN | 100426752 C | 10/2008 |
| CN | 101931560 A | 12/2010 |
| CN | 102143599 A | 8/2011 |
| CN | 102149069 A | 8/2011 |
| CN | 102308662 A | 1/2012 |
| CN | 103220815 A | 7/2013 |
| CN | 104639348 A | 5/2015 |
| CN | 105993188 A | 10/2016 |
| CN | 107241755 A | 10/2017 |
| EP | 2890208 A1 | 7/2015 |
| EP | 3611956 A1 | 2/2020 |
| JP | 2005167783 A | 6/2005 |

OTHER PUBLICATIONS

Garcia-Perez Cesar A et al: Enabling Low Latency Services on LTE Networks, 2016 IEEE 1st International Workshops on Foundations and Applications of Self* Systems (Fas*W), IEEE, Sep. 12, 2016 (Sep. 12, 2016), pp. 248-255, XP033023847.

* cited by examiner

COMMUNICATION METHOD TO GENERATE A SERVICE CONNECTION CONFIGURATION OF A BEARER NETWORK, NETWORK SERVER, AND COMPUTER-READABLE STORAGE MEDIUM

CROSS-REFERENCE TO RELATED APPLICATIONS

This application is a continuation of International Application No. PCT/CN2018/090770, filed on Jun. 12, 2018, which claims priority to Chinese Patent Application No. 201710567903.1, filed on Jul. 12, 2017. The disclosures of the aforementioned applications are hereby incorporated by reference in their entireties.

TECHNICAL FIELD

Aspects of this application relate to the communications field, and in particular, to a communication method, a network server, and a computer-readable storage medium.

BACKGROUND

To facilitate management and improve network performance, large and medium-sized networks are usually designed based on a standard three-layer structure. A three-layer network in a hierarchical architecture is used in a three-layer network architecture. To be specific, a complex network design is divided into several layers, and each layer focuses on some specific functions, so that a complicated big problem can be broken up into many small simple problems.

Specifically, there are three layers in a network designed with a three-layer network architecture: a core layer is a trunk for high-speed exchange of the network, and provides optimal interval transmission; an aggregation layer can provide a policy-based connection; and an access layer provides user-to-network access for a multi-service application and another network application.

Traffic from a base station to the core layer is south-north traffic, and traffic between base stations is east-west traffic. A packet transport network (PTN) and an IP radio access network (IP RAN) mobile backhaul bearer network are used in current 2 G/3 G/4 G/4.5 G, and there is a low requirement for an east-west traffic connection.

Most east-west traffic connections are implemented in an access/aggregation large layer-2+core layer-3 networking mode. In addition, in actual existing network service deployment, manual planning is performed first, and then a service is manually configured through network management or by using a command line.

FIG. 1 shows a three-layer network architecture in the prior art. A mobility management entity (MME)/an evolved packet core (EPC) exchanges data with a radio base station through a core layer, an aggregation layer, and an access layer. A mobile cloud engine (MCE) exchanges data with the base station through the aggregation layer and the access layer.

5 G service routes are further diversified, and nodes on an access ring are fully meshed. Service flows are described below with reference to FIG. 1.

S1 is a backhaul service flow from the radio base station to a core network service gateway (Service Gateway, SGW)/a core network Internet gateway (Packet Gateway, PGW) through a network bearer device, and a path of S1 is shortened as a virtual packet core (vEPC) network sinks.

Xn is a service flow from a baseband processing unit (Building Base band Unit, BBU) to the MCE through a network bearer device.

X2 is east-west traffic between base stations that is brought by moving of a terminal, has a low requirement for a delay/jitter (at an ms level), and can cross the access ring.

EX2 is east-west traffic brought by new functions such as carrier aggregation (CA) and coordinated multipoint transmission/reception (COMP) between base stations, has a high requirement for clock progress (±1130 ns), and cannot cross the access ring.

S1 and Xn are north-south traffic, and X2 and EX2 are east-west traffic.

When a future bearer network opens a service for a 5 G base station, a quantity of S1/Xn services/tunnels is in direct proportion to a quantity of base stations. However, there are the following difficulties in opening an X2/EX2 service:

East-west traffic between base stations (such as EX2 traffic and X2 traffic between base stations) is related to locations of the base stations, and the locations and an adjacent relationship of the base stations are manually confirmed, to generate a service connection configuration of the bearer network. Therefore, an error rate is relatively high and work efficiency is low.

SUMMARY

Embodiments of the present invention provide a communication method, to automatically generate a service connection configuration of a bearer network, thereby reducing an error rate and improving work efficiency.

The embodiments of the present invention further provide a communications apparatus, to automatically generate a service connection configuration of a bearer network, thereby reducing an error rate and improving work efficiency.

The embodiments of the present invention provide a computer-readable storage medium, to automatically generate a service connection configuration of a bearer network, thereby reducing an error rate and improving work efficiency.

According to a first aspect, an embodiment of the present invention provides a communication method, where the method includes:

determining, by a network server, a first correspondence, where the first correspondence is a correspondence between geographical location information of a base station and a network element identifier ID of a network element connected to the base station;

obtaining, by the network server, a first connection relationship based on geographical location information of a plurality of base stations, where the first connection relationship is a connection relationship between the plurality of base stations;

converting, by the network server, the first connection relationship into a second connection relationship based on the first correspondence, where the second connection relationship is a topological connection relationship between a plurality of network elements included in a bearer network, and the plurality of base stations are respectively connected to the plurality of network elements in a one-to-one correspondence; and generating, by the network server, a service connection configuration of the bearer network based on the second connection relationship.

With reference to the first aspect, in a first possible implementation, presetting a wireless plan between the base stations includes:

the base stations are adjacent to each other, and an adjacent distance between the base stations is greater than or equal to a preset minimum threshold and less than or equal to a preset maximum threshold.

With reference to the first aspect, in a second possible implementation, the converting, by the network server, the first connection relationship into a second connection relationship based on the first correspondence specifically includes:

determining, by the network server, a third connection relationship based on a second correspondence and the first correspondence, where the second correspondence is a correspondence between the geographical location information of the plurality of base stations and ports of the plurality of network elements, and the third connection relationship is a connection relationship between the base stations and the network elements; and determining, by the network server, the second connection relationship based on the first connection relationship and the third connection relationship.

With reference to the first aspect, in a first case of the second possible implementation, before the determining, by the network server, a third connection relationship, the method further includes:

presetting, by the network server, the second correspondence.

With reference to the first aspect, in a second case of the second possible implementation, before the determining, by the network server, a third connection relationship, the method further includes:

determining, by the network server, the second correspondence if the network server determines, based on an internet protocol IP address of the base station and an IP address of a port through which the network element is connected to the base station, that the base station and the port through which the network element is connected to the base station are in a same local area network.

With reference to the first aspect, in a third possible implementation, the generating, by the network server, a service connection configuration of the bearer network based on the second connection relationship includes:

generating, based on the second connection relationship, tunnel configuration information of a tunnel used to bear traffic between base stations and/or route diffusion configuration information that is based on a tunnel configuration.

According to a second aspect, an embodiment of the present invention provides a network server, where the network server includes:

a first processing module, configured to determine a first correspondence, where the first correspondence is a correspondence between geographical location information of a base station and a network element identifier ID of a network element connected to the base station;

a second processing module, configured to obtain a first connection relationship based on geographical location information of a plurality of base stations, where the first connection relationship is a connection relationship between the plurality of base stations;

a third processing module, configured to convert the first connection relationship into a second connection relationship based on the first correspondence, where the second connection relationship is a topological connection relationship between a plurality of network elements included in a bearer network, and the plurality of base stations are respectively connected to the plurality of network elements in a one-to-one correspondence; and a fourth processing module, configured to generate a service connection configuration of the bearer network based on the second connection relationship.

With reference to the second aspect, in a first possible implementation, presetting a wireless plan between the base stations includes:

the base stations are adjacent to each other, and an adjacent distance between the base stations is greater than or equal to a preset minimum threshold and less than or equal to a preset maximum threshold.

With reference to the second aspect, in a second possible implementation, the third processing module is further configured to: determine a third connection relationship based on a second correspondence and the first correspondence, where the second correspondence is a correspondence between geographical location information of a plurality of base stations and ports of a plurality of network elements; and determine the second connection relationship based on the first connection relationship and the third connection relationship.

With reference to the second aspect, in a first case of the second possible implementation, the apparatus further includes:

a fifth processing module, configured to preset the second correspondence.

With reference to the second aspect, in a second case of the second possible implementation, the apparatus further includes:

a sixth processing module, configured to determine the second correspondence if the sixth processing module determines, based on an internet protocol IP address of the base station and an IP address of a port through which the network element is connected to the base station, that the base station and the port through which the network element is connected to the base station are in a same local area network.

With reference to the second aspect, in a third possible implementation, the apparatus further includes:

a seventh processing module, configured to generate, based on the second connection relationship, tunnel configuration information of a tunnel used to bear traffic between base stations and/or route diffusion configuration information that is based on a tunnel configuration.

A third aspect of this application provides a computer-readable storage medium. The computer-readable storage medium stores an instruction. When the instruction is run on a computer, the computer is enabled to perform the method in the foregoing aspects.

A fourth aspect of this application provides a computer program product that includes an instruction. When the computer program product is run on a computer, the computer is enabled to perform the method in the foregoing aspects.

A fifth aspect of this application provides a computer program. When the computer program is run on a computer, the computer is enabled to perform the method in the foregoing aspects.

It can be learned from the foregoing technical solutions, the network server determines the first correspondence; the network server obtains the first connection relationship based on the geographical location information of the plurality of base stations; then, the network server converts the first connection relationship to the second connection relationship based on the first correspondence, where the plurality of base stations are respectively connected to the plurality of network elements in a one-to-one correspondence; and finally, the network server generates the service connection configuration of the bearer network based on the second connection relationship. Because the first connection relationship can be automatically converted into the second connection relationship, the service connection configuration of the bearer network can be automatically generated, thereby reducing an error rate and improving work efficiency.

BRIEF DESCRIPTION OF DRAWINGS

The present invention can be better understood from the following descriptions of specific implementations of the present invention with reference to the accompanying drawings, and same or similar reference numerals indicate same or similar features.

DESCRIPTION OF EMBODIMENTS

In the embodiments of the present invention, first, a network server determines a first correspondence. After converting a first connection relationship into a second connection relationship, the network server may generate a service connection configuration of a bearer network based on the second connection relationship. Because the service connection configuration of the bearer network can be automatically generated by using the second connection relationship, an error rate can be reduced and work efficiency can be improved.

Figure 1:
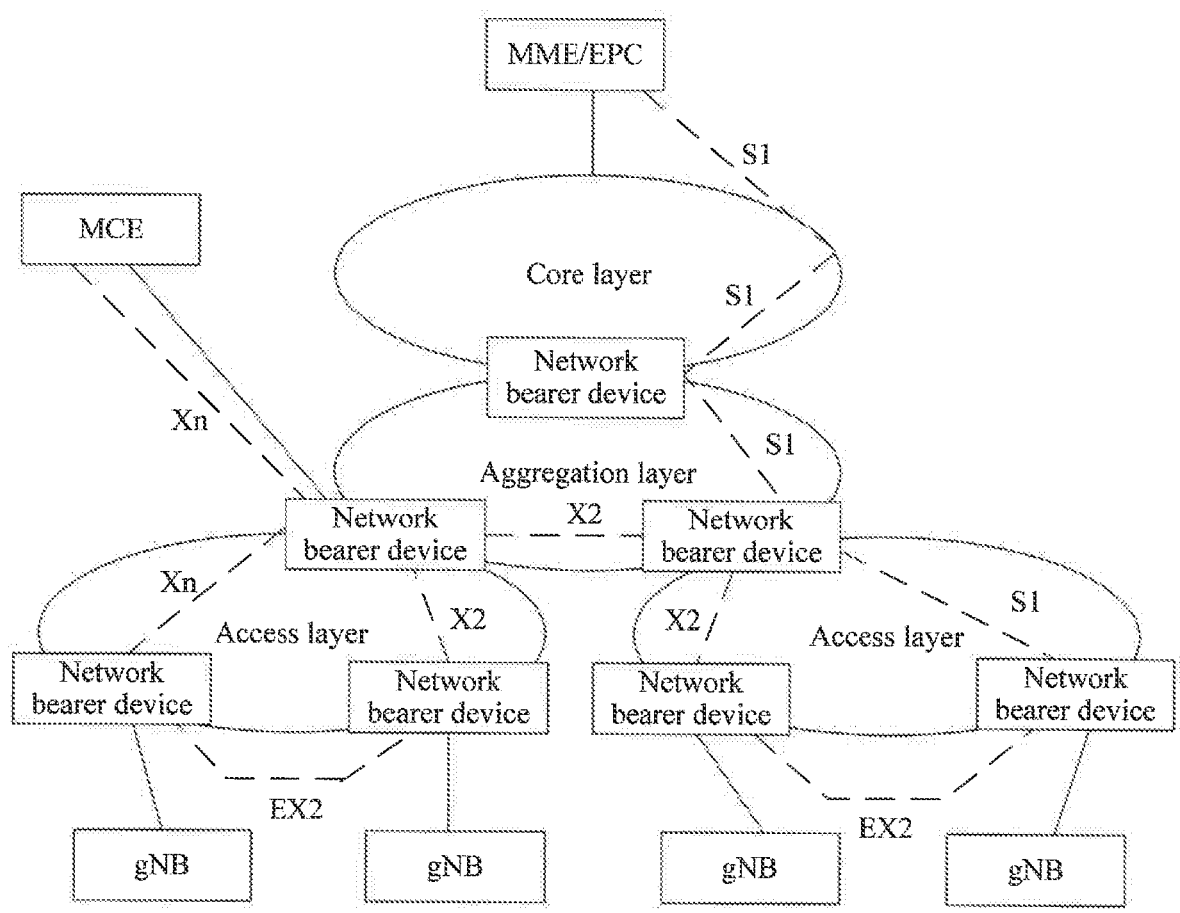
FIG. 1 is a schematic diagram of a three-layer network architecture in the prior art.
Figure 2:
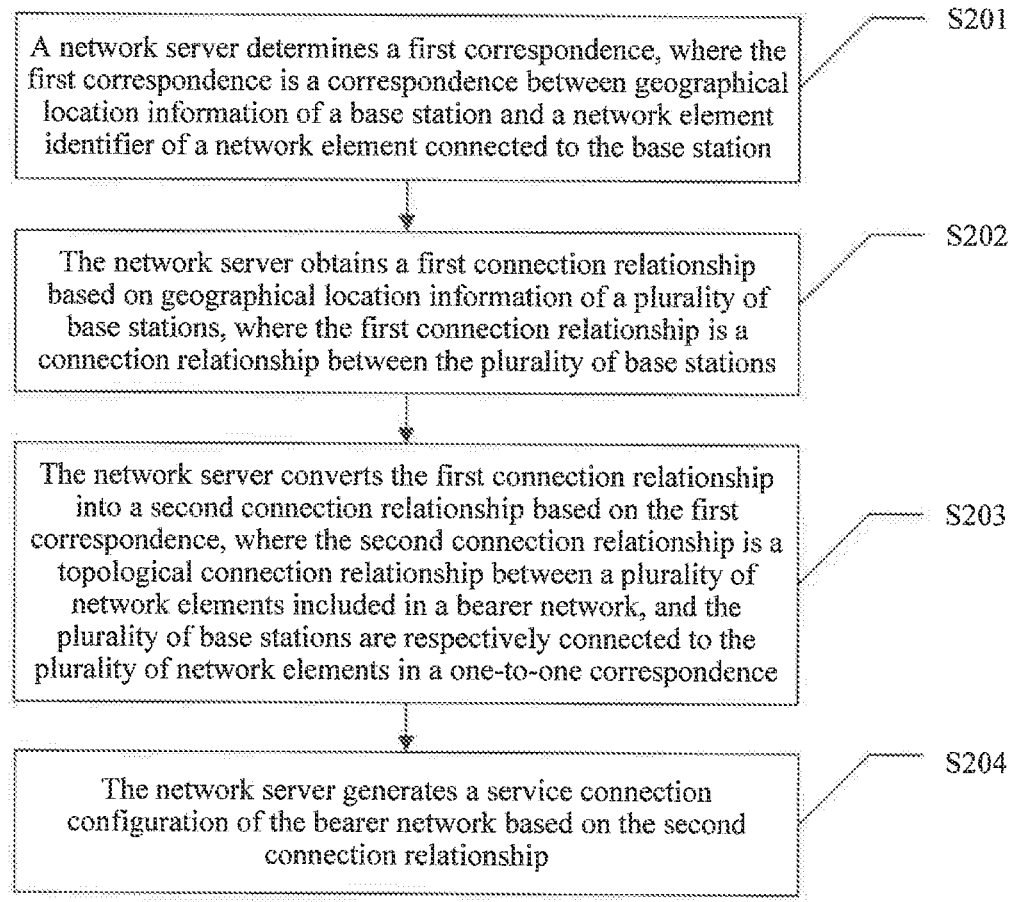
FIG. 2 is a schematic flowchart of a communication method according to an embodiment of the present invention.

FIG. 2 is a schematic flowchart of a communication method according to an embodiment of the present invention. This embodiment of the present invention may be executed by a network server, and the communication method specifically includes the following steps.

S201. The network server determines a first correspondence, where the first correspondence is a correspondence between geographical location information of a base station and a network element identifier of a network element connected to the base station.

In a communications system, the base station is located between a wired communications network and a wireless terminal, to transmit a radio signal between the wired communications network and the wireless terminal. In a place at which there is a relatively large quantity of wireless terminals, for example, a traffic hub with relatively large density of population, a relatively large quantity of base stations are built to ensure normal communication between the wireless terminals. In other words, the base stations are not evenly distributed, and a given quantity of base stations are built based on a communication requirement of the wireless terminals. The wireless terminal may also be a mobile terminal.

Each network element in a communications network has a network element identifier (ID), and the network element identifier is an identifier that distinguishes one network element from another, such as an IP address or a MAC address. In a communication process, the base station needs to interact with another network element to implement communication. Therefore, there is a correspondence between the base station and the network element ID of the network element connected to the base station.

The geographical location information of the base station is unique, and may be determined in a plurality of manners. For example, the geographical location information of the base station may be obtained by using an application program of a mobile terminal; or the geographical location information of the base station may be obtained by using map software; or the geographical location information of the base station may be obtained by using a location based service (LBS) provided by a communications operator. The geographical location information of the base station may include longitude information and latitude information, and may further include guidance information. For example, the guidance information is a reference building.

Therefore, the correspondence between the geographical location information of the base station and the network element ID of the network element connected to the base station may be established based on the correspondence between the base station and the network element ID of the network element connected to the base station, and based on the geographical location information of the base station. The correspondence between the geographical location information of the base station and the network element identifier of the network element connected to the base station is used as the first correspondence.

The first correspondence may be stored. When required, the first correspondence is directly obtained.

S202. The network server obtains a first connection relationship based on geographical location information of a plurality of base stations, where the first connection relationship is a connection relationship between the plurality of base stations.

Traffic between base stations, namely, east-west traffic between the base stations (such as EX2 traffic and X2 traffic between the base stations), is related to geographic locations of the base stations. A distance between two base stations is positively correlated with a connection relationship between the base stations. To be specific, a closer distance between two base stations indicates a closer connection relationship between the two base stations, and a further distance between two base stations indicates a more distant connection relationship between the two base stations.

A wireless plan between the base stations may be preset, and the first connection relationship is calculated based on the geographical location information of the base stations and the preset wireless plan between the base stations. The base station may determine a traffic path between the base station and another base station based on the first connection relationship. In this way, data may be transmitted between the base stations based on the traffic path between the base stations.

For example, the first connection relationship may be that a base station 1 is connected to a base station 3, the base station 3 is connected to a base station 4, and the base station 4 is connected to the base station 1.

It can be learned that different preset wireless plans may be used to determine different first connection relationships. A wireless plan may be preset based on an actual technical requirement to determine a required first connection relationship.

In this embodiment of the present invention, S201 and S202 may be performed simultaneously, or may be performed in any sequence.

S203. The network server converts the first connection relationship into a second connection relationship based on the first correspondence, where the second connection relationship is a topological connection relationship between a plurality of network elements included in a bearer network, and the plurality of base stations are respectively connected to the plurality of network elements in a one-to-one correspondence.

Based on the first correspondence, each base station can implement communication by using a network element corresponding to a network element ID.

Based on the first connection relationship, data transmission between two base stations may be implemented by using network elements that are respectively connected to the base stations. In other words, the base station performs communication by using the network element, and a connection relationship between the base station and the network element is obtained based on a network element ID corresponding to the base station. The second connection relationship may be further obtained based on the first connection relationship.

The second connection relationship means a connection relationship between a plurality of network elements. For example, a first network element is connected to a second network element, the second network element is connected to a fourth network element, and the fourth network element is connected to the first network element.

S204. The network server generates a service connection configuration of the bearer network based on the second connection relationship.

The second connection relationship is a connection relationship between the plurality of network elements in the bearer network, and a link used for transmitting data between network elements may be further obtained. Therefore, the service connection configuration of the bearer network may be generated based on the second connection relationship.

In this embodiment of the present invention, the network server determines the first correspondence, and the network server obtains the first connection relationship based on the geographical location information of the base stations. Then, the network server directly converts the first connection relationship into the second connection relationship based on the first correspondence. The network server automatically generates the service connection configuration of the bearer network based on the second connection relationship.

Because the first connection relationship may be converted into the second connection relationship, and even if a service connection volume is heavy, the service connection configuration of the bearer network may be automatically generated based on the second connection relationship, an error rate is reduced and work efficiency is improved.

In a 3 G/4 G wireless network, a wireless terminal and a base station are usually in a one-to-one correspondence, and both a communication service and a data service belong to a same base station. In a 5 G wireless network, a requirement on bandwidth soars, and two or even more base stations jointly serve a same wireless terminal, thereby leading to data exchange between base stations. The data exchange between the base stations has high requirements on a latency and clock precision. A smaller clock deviation between two base stations and a smaller latency indicate higher bandwidth provided for the wireless terminal and better service quality. The clock deviation and the latency are directly related to a distance between the base stations.

In an optional embodiment of the present invention, a preset wireless plan between base stations may be preset based on a specific communication requirement. To ensure correctness of data transmission, base stations that are relatively close to each other may be selected to generate an optimal coordinative connection relationship between the base stations.

Specifically, a relationship between two base stations may be adjacent or non-adjacent. Apparently, accuracy of transmitting data between two adjacent base stations is higher than accuracy of transmitting data between two non-adjacent base stations. In this case, adjacent base stations are preferably selected.

One base station is adjacent to more than one base station, and a shorter adjacent distance between two base stations leads to higher accuracy of transmitting data between the two base stations. Therefore, one or more base stations that are relatively close to each other may be selected to generate an optimal coordinative connection relationship between the base stations.

In other words, the preset wireless plan between base stations includes that the base stations are adjacent and an adjacent distance between the base stations is greater than or equal to a preset minimum threshold and less than or equal to a preset maximum threshold. The preset minimum threshold and the preset maximum threshold may be separately set based on specific situations.

Figure 3:
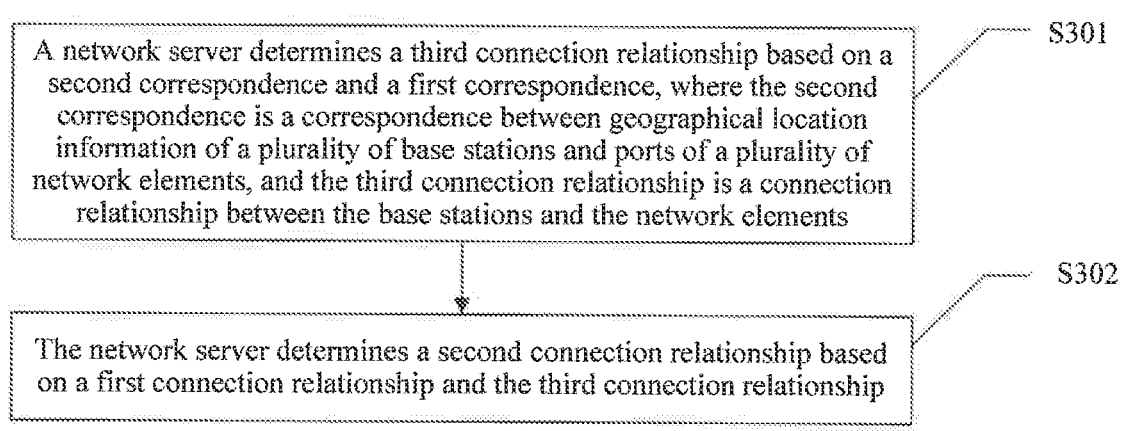
FIG. 3 is a schematic flowchart of converting a first connection relationship into a second connection relationship according to an embodiment of the present invention.

In an optional embodiment of the present invention, the following technical solution may be specifically used to convert the first connection relationship into the second connection relationship, as shown in FIG. 3.

A base station needs to access a network element first. The network element may be a network bearer device. Specifically, the network bearer device forwards, to a wireless core network, information sent by the base station, to implement wireless communication.

S301. A network server determines a third connection relationship based on a second correspondence and a first correspondence, where the second correspondence is a correspondence between geographical location information of a plurality of base stations and ports of a plurality of network elements, and the third connection relationship is a connection relationship between the base stations and the network elements.

The base station performs communication by using the network element, and the network element has more than one interface. Specifically, the base station performs communication by using an interface of the network element. In this case, there is a correspondence between geographical location information of the base station and a port through which the network element is connected to the base station. The correspondence between the geographical location information of the plurality of base stations and the ports of the plurality of network elements is used as the second correspondence. A network element connected to the base station may be a network bearer device.

Based on the first correspondence and the second correspondence, a relationship between geographic allocation information of the base station and a port through which the network element is connected to the base station, and a relationship between the address location information of the base station and a network element ID of the network element connected to the base station may be obtained.

To be specific, a connection relationship between the base station and the network element includes the relationship between the address location information of the base station and the port through which the network element is connected to the base station, and the relationship between the address location information of the base station and the network element ID of the network element connected to the base station. The connection relationship between the base station and the network element is used as the third connection relationship.

A base station that sends data is a source node, and a base station that receives data is a sink node. Because the base station can send and receive data, the base station may be a service endpoint.

S302. The network server determines a second connection relationship based on a first connection relationship and the third connection relationship.

The base station performs communication by using the network element. If the network element connected to the base station is found, the base station connected to the network element may be determined.

In consideration of a connection relationship between the base station and the network element, a base station in the first connection relationship may be replaced, based on the third connection relationship, with the network element corresponding to the base station. In this case, in the first connection relationship, if the base station is replaced with the network element corresponding to the base station, the first connection relationship is converted into the second connection relationship.

In this embodiment of the present invention, when a base station in the second connection relationship is directly replaced with a corresponding network element, less time is consumed in a replacement process. Therefore, work efficiency of generating a service connection configuration can be improved.

In an optional embodiment of the present invention, the second correspondence may be determined in the following manner.

In a process of establishing a wireless network, the network server may preset the second correspondence. For example, a first network element includes a first port and a second port. If a first base station is preset to perform communication by using the first port of the first network element, a correspondence between the first base station and the first port of the first network element may be preset. In other words, a correspondence between a base station and a port of a network element is preset.

In an optional embodiment of the present invention, the second correspondence may be determined in the following manner.

In a communication process, the network server determines the second correspondence if the network server determines, based on an Internet protocol IP address of the base station and an IP address of a port through which the network element is connected to the base station, that the base station and the port through which the network element is connected to the base station are in a same local area network.

For example, if the IP address of the base station and the IP address of the port through which the network element is connected to the base station are in a same network segment, the base station and the port through which the network element is connected to the base station are in a same local area network, and this indicates that there is a correspondence between the base station and the port of the network element.

In other words, if the base station and the port through which the network element is connected to the base station are in a same local area network, there is a correspondence between the base station and the port of the network element. If there is a correspondence between the base station and the port through which the network element is connected to the base station, the base station and the port of the network element are in a same local area network.

In an optional embodiment of the present invention, tunnel configuration information of a tunnel used to bear traffic between base stations and/or route diffusion configuration information that is based on a tunnel configuration may be generated by using the second connection relationship.

Specifically, a virtual private network (Virtual Private Network, VPN) technology can effectively simplify a traffic configuration. A VPN has two features: virtualization and dedication, and may be used to decompose an existing IP network into logically separated networks. A basic principle of the VPN is to use a tunnel technology to encapsulate to-be-sent data into a tunnel, and implement transparent transmission of data by using a dedicated data transmission channel established in a VPN backbone network.

A tunnel and a route are VPN bearer technologies used to bear traffic between base stations. The second connection relationship may be used to generate tunnel configuration information of the tunnel bearing the traffic between base stations and/or route diffusion configuration information that is based on a tunnel configuration and that is of the route bearing the traffic between base stations.

The tunnel includes a VPN tunnel, for example, a multi-protocol label switching transport profile (MPLS-TP) tunnel, a resource reservation protocol-traffic engineering (RSVP-TE) tunnel, an IP tunnel, or a generic routing encapsulation (GRE) tunnel.

Figure 4:
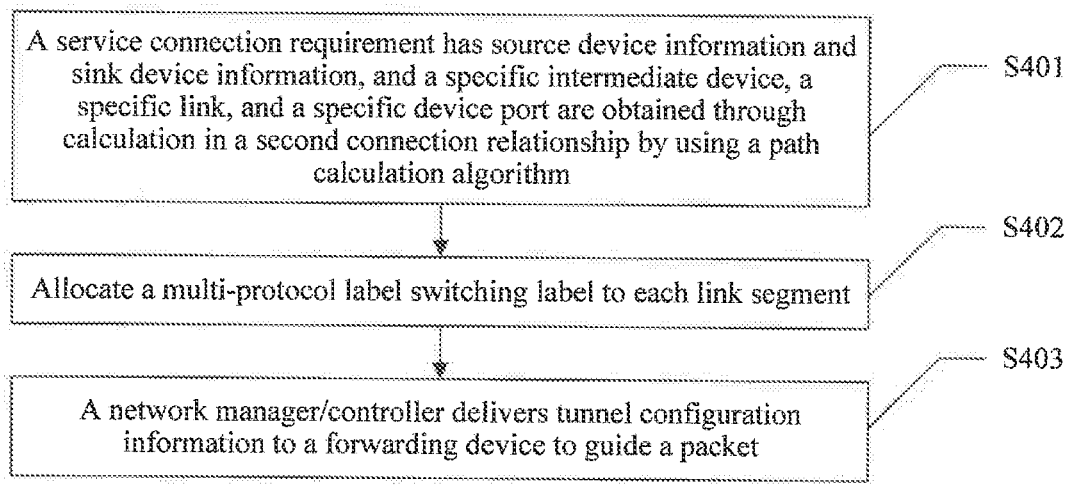
FIG. 4 is a schematic flowchart of generating a configuration of a tunnel bearing traffic between base stations according to an embodiment of the present invention.

Generating, based on the second connection relationship, a configuration of a tunnel bearing traffic between base stations is used as an example below for description, as shown in FIG. 4.

S401. A service connection requirement has source device information and sink device information, and a specific intermediate device, a specific link, and a specific device port are obtained through calculation in a second connection relationship by using a path calculation algorithm.

The service connection requirement includes the source device information and the sink device information. First, a link between a source device and a sink device may be determined by using the path calculation algorithm, for example, a Dijkstra algorithm or a Floyd algorithm.

Then, a network element related to the link may be determined in the second connection relationship based on the link between the source device and the sink device. The related network element may include a specific intermediate device and a specific device port.

S402. Allocate a multiprotocol label switching (MPLS) label to each link segment.

The link between the source device and the sink device specifically includes a link between network elements. In this case, an MPLS label needs to be allocated to each link segment. Specifically, a downstream network element allocates an MPLS label to an upstream network element.

An ingress port, an ingress MPLS label, an egress port, and an egress MPLS label of each hop of network element, and a label action (Push/PoP/Swap) are determined.

S403. A network manager/controller delivers tunnel configuration information to a forwarding device to guide a packet.

Finally, the network manager/controller delivers the tunnel configuration information to the forwarding device to guide packet transmission.

Figure 5:
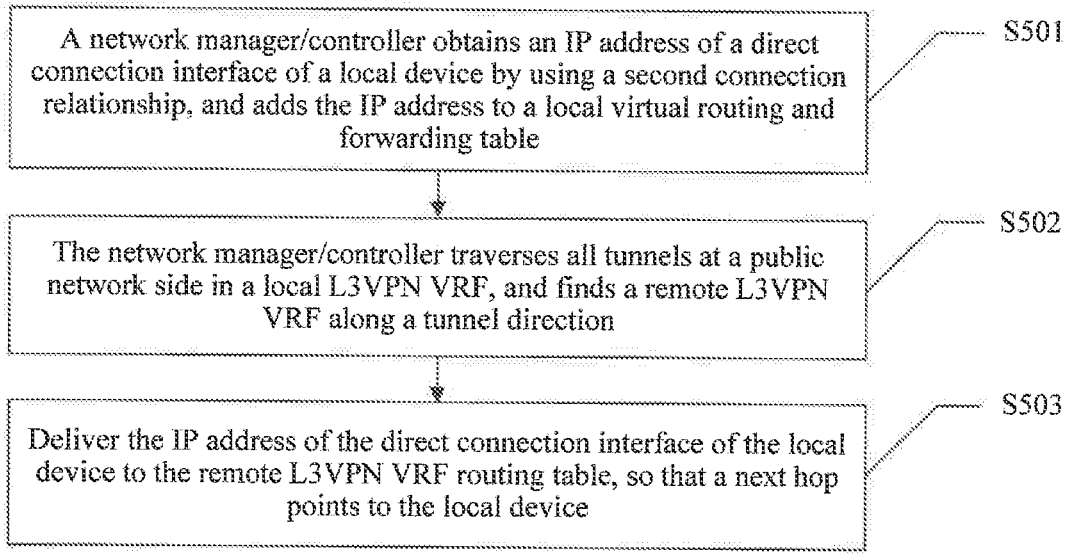
FIG. 5 is a schematic flowchart of generating a diffusion configuration of a route bearing traffic between base stations according to an embodiment of the present invention.

Generating, based on the second connection relationship, a diffusion configuration of a route bearing traffic between base stations is used as an example below for description, as shown in FIG. 5.

The route extension configuration is obtained based on a tunnel configuration, and a route extension configuration may include a route extension configuration in a public network, and may further include a route extension configuration in a private network.

S501. A network manager/controller obtains an IP address of a direct connection interface of a local device by using a second connection relationship, and adds the IP address to a local virtual routing and forwarding (VRF) table.

The network manager/controller may directly obtain the IP address corresponding to the direct connection interface of the local device by using the second connection relationship, and adds the obtained IP address corresponding to the direct connection interface of the local device to the VRF.

After the IP address corresponding to the direct connection interface of the local device is added to the VRF, another network element may be connected to the direct connection interface of the local device based on the VRF.

S502. The network manager/controller searches all tunnels at a public network side in a local L3VPN VRF, and finds a remote L3VPN VRF along a tunnel direction.

In consideration that the VRF records a routing and forwarding table of a user network edge router directly connected to a backbone network edge router, the network manager/controller searches all the tunnels at the public network side in the local L3VPN VRF, to search for the furthest L3VPN VRF.

Searching for the furthest L3VPN VRF is to find the remote L3VPN VRF along the tunnel direction.

S503. Deliver the IP address of the direct connection interface of the local device to the remote L3VPN VRF routing table, so that a next hop points to the local device.

After the remote L3VPN VRF is found along the tunnel direction, the IP address of the direct connection interface of the local device can be delivered to the remote L3VPN VRF routing table, so that the next hop points to the local device. In this way, a connection relationship between the local device and another network element is established.

Figure 6:
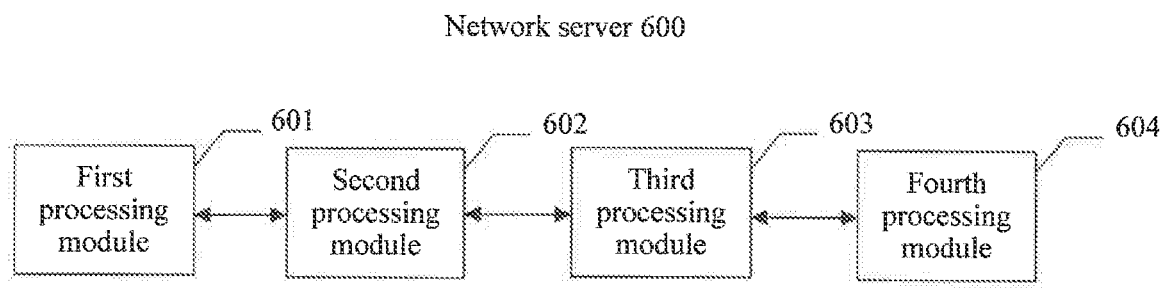
FIG. 6 is a schematic structural diagram of a network server according to an embodiment of the present invention.

FIG. 6 is a schematic structural diagram of a network server 600 according to an embodiment of the present invention. The network server 600 specifically includes a first processing module 601, a second processing module 602, a third processing module 603, and a fourth processing module 604. The four processing modules may be in a same apparatus, for example, in a same network server; or the four processing modules may be in different apparatuses.

The first processing module 601 is configured to determine a first correspondence, where the first correspondence is a correspondence between geographical location information of a base station and a network element identifier ID of a network element connected to the base station.

Each network element in a communications network has a network element ID, and the network element identifier is an identifier that distinguishes one network element from another, such as an IP address or a MAC address. In a communication process, the base station needs to interact with another network element to implement communication. Therefore, there is a correspondence between the base station and the network element D of the network element connected to the base station.

The geographical location information of the base station is unique, and may be determined in a plurality of manners. For example, the geographical location information of the base station may be obtained by using an application program of a mobile terminal; or the geographical location information of the base station may be obtained by using map software; or the geographical location information of the base station may be obtained by using an LBS provided by a communications operator. The geographical location information of the base station may include longitude information and latitude information, and may further include guidance information. For example, the guidance information is a reference building.

Therefore, the correspondence between the geographical location information of the base station and the network element ID of the network element connected to the base station may be established based on the correspondence between the base station and the network element ID of the network element connected to the base station, and based on the geographical location information of the base station.

The correspondence between the geographical location information of the base station and the network element ID of the network element connected to the base station may be stored. When required, the correspondence between the geographical location information of the base station and the network element ID of the network element connected to the base station is directly obtained. The correspondence between the geographical location information of the base station and the network element identifier of the network element connected to the base station is used as the first correspondence.

The second processing module 602 is configured to obtain a first connection relationship based on geographical location information of a plurality of base stations, where the first connection relationship is a connection relationship between the plurality of base stations.

A wireless plan between the base stations may be preset, and the first connection relationship is calculated based on the geographical location information of the base stations and the preset wireless plan between the base stations. The base station may determine a traffic path between the base station and another base station based on the first connection relationship. In this way, data may be transmitted between the base stations based on the traffic path between the base stations.

For example, the first connection relationship may be that a base station 1 is connected to a base station 3, the base station 3 is connected to a base station 4, and the base station 4 is connected to the base station 1.

It can be learned that different preset wireless plans may be used to determine different first connection relationships.

A wireless plan may be preset based on an actual technical requirement to determine a required first connection relationship.

The third processing module 603 is configured to convert the first connection relationship into a second connection relationship based on the first correspondence, where the second connection relationship is a topological connection relationship between a plurality of network elements included in a bearer network, and the plurality of base stations are respectively connected to the plurality of network elements in a one-to-one correspondence.

Based on the first correspondence, each base station can implement communication by using a network element corresponding to a network element ID.

Based on the first connection relationship, data transmission between two base stations may be implemented by using network elements that are respectively connected to the base stations. In other words, the base station performs communication by using the network element, and a connection relationship between the base station and the network element is obtained based on a network element ID corresponding to the base station. The second connection relationship may be further obtained based on the first connection relationship.

The second connection relationship means a connection relationship between a plurality of network elements. For example, a first network element is connected to a second network element, the second network element is connected to a fourth network element, and the fourth network element is connected to the first network element.

The fourth processing module 604 is configured to generate a service connection configuration of the bearer network based on the second connection relationship.

In this embodiment of the present invention, the first processing module 601 determines the first correspondence. The second processing module 602 obtains the first connection relationship based on the geographical location information of the plurality of base stations. Then, the first processing module 603 converts the first connection relationship into the second connection relationship based on the first correspondence. The fourth processing module 604 automatically generates the service connection configuration of the bearer network based on the second connection relationship. Because the first connection relationship may be converted into the second connection relationship, and even if a service connection volume is heavy, the service connection configuration of the bearer network may be automatically generated based on the second connection relationship, an error rate is reduced and work efficiency is improved.

In an optional embodiment of the present invention, a preset wireless plan between base stations may be preset based on a specific communication requirement. To ensure correctness of data transmission, base stations that are relatively close to each other may be selected to generate an optimal coordinative connection relationship between the base stations.

Specifically, a relationship between two base stations may be adjacent or non-adjacent. Apparently, accuracy of transmitting data between two adjacent base stations is higher than accuracy of transmitting data between two non-adjacent base stations. In this case, adjacent base stations are preferably selected.

One base station is adjacent to more than one base station, and a shorter adjacent distance between two base stations leads to higher accuracy of transmitting data between the two base stations. Therefore, one or more base stations that are relatively close to each other may be selected to generate an optimal coordinative connection relationship between the base stations.

In other words, the preset wireless plan between base stations includes that the base stations are adjacent and an adjacent distance between the base stations is greater than or equal to a preset minimum threshold and less than or equal to a preset maximum threshold. The preset minimum threshold and the preset maximum threshold may be separately set based on specific situations.

In an optional embodiment of the present invention, the third processing module 603 is further configured to: determine a third connection relationship based on a second correspondence and the first correspondence, where the second correspondence is a correspondence between geographical location information of a plurality of base stations and ports of a plurality of network elements, and the third connection relationship is a connection relationship between the base stations and the network elements; and determine the second connection relationship based on the first connection relationship and the third connection relationship.

Figure 7:
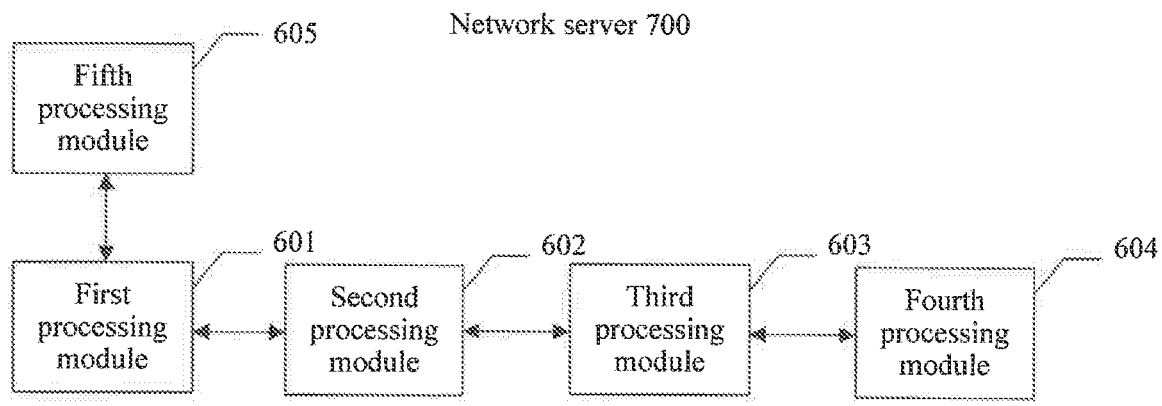
FIG. 7 is a schematic structural diagram of a network server according to another embodiment of the present invention.

FIG. 7 is a schematic structural diagram of a network server 700 according to another embodiment of the present invention. A fifth processing module 605 is added on the basis of the apparatus in FIG. 6.

The fifth processing module 605 is configured to preset the second correspondence.

Figure 8:
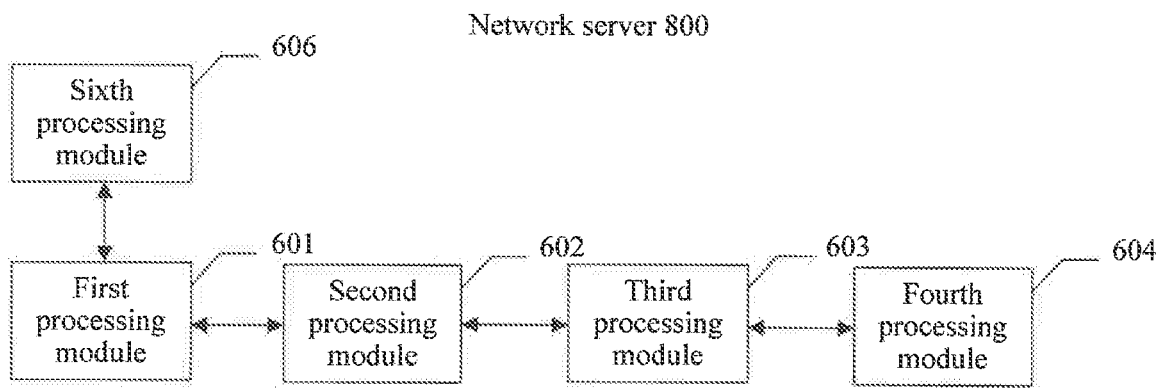
FIG. 8 is a schematic structural diagram of a network server according to still another embodiment of the present invention.

FIG. 8 is a schematic structural diagram of a network server 800 according to still another embodiment of the present invention. A sixth processing module 606 is added on the basis of the apparatus in FIG. 6.

The sixth processing module 606 is configured to determine the second correspondence if the sixth processing module 606 determines, based on an IP address of the base station and an IP address of a port through which the network element is connected to the base station, that the base station and the port through which the network element is connected to the base station are in a same local area network.

Figure 9:
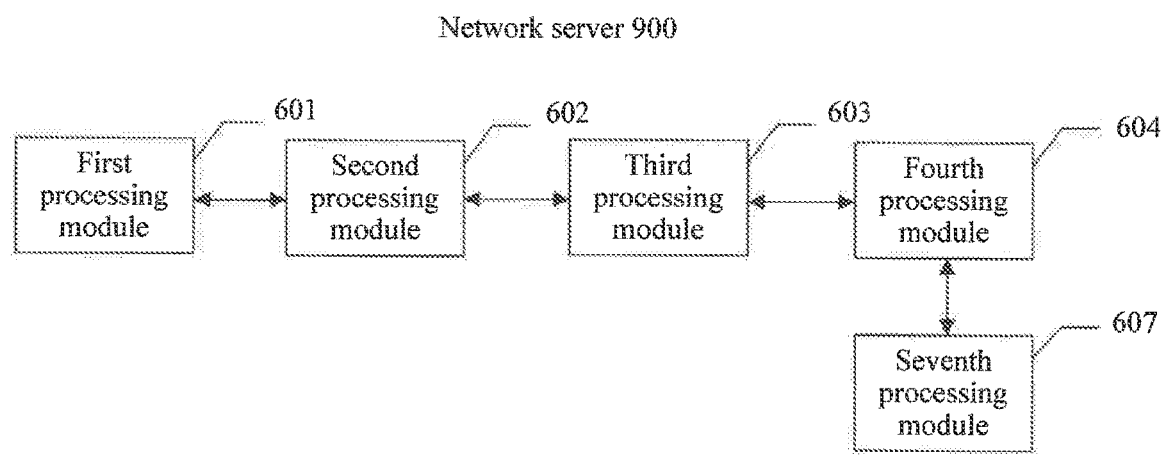
FIG. 9 is a schematic structural diagram of a network server according to yet another embodiment of the present invention.

FIG. 9 is a schematic structural diagram of a network server 900 according to yet another embodiment of the present invention. A seventh processing module 607 is added on the basis of the apparatus in FIG. 6.

The seventh processing module 607 is configured to generate, based on the second connection relationship, tunnel configuration information of a tunnel used to bear traffic between base stations and/or route diffusion configuration information that is based on a tunnel configuration.

The network server provided in this application is described merely by using division of the foregoing functional modules as an example. In actual application, the foregoing functions may be integrated into one functional module for implementation; or the foregoing functions may be allocated to different functional modules for implementation as required, to be specific, an internal structure of a device is divided into different functional modules to complete all or some of the functions described above. This is not specifically limited in this application.

Figure 10:
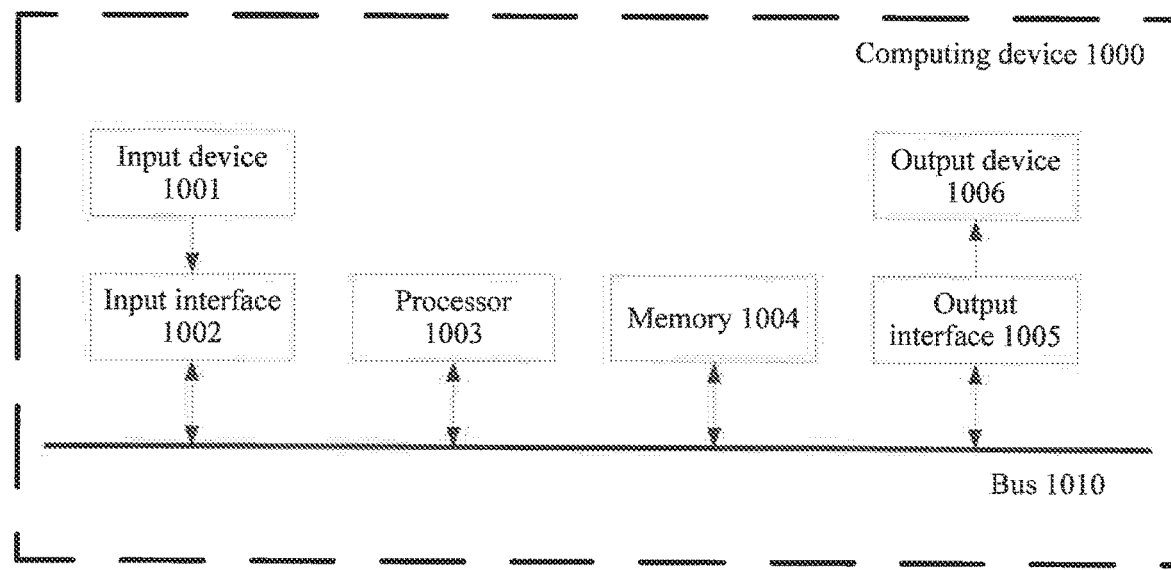
FIG. 10 is a structural diagram of an example hardware architecture of a computing device that can implement a communication method and a network server according to embodiments of the present invention.

FIG. 10 is a structural diagram of an example hardware architecture of a computing device that can implement the communication method and the network server according to the embodiments of the present invention. As shown in FIG. 10, a computing device 1000 includes an input device 1001, an input interface 1002, a processor 1003, a memory 1004, an output interface 1005, and an output device 1006.

The input interface 1002, the processor 1003, the memory 1004, and the output interface 1005 are connected to each other by using a bus 1010, The input device 1001 and the output device 1006 are respectively connected to the bus 1010 by using the input interface 1002 and the output interface 1005, to further connect to other components of the computing device 1000.

Specifically, the input device 1001 receives external input information, and transmits the input information to the processor 1003 through the input interface 1002. The processor 1003 processes the input information according to a computer-executable instruction stored in the memory 1004, to generate output information, temporarily or permanently stores the output information in the memory 1004, and then transmits the output information to the output device 1006 through the output interface 1005. The output device 1006 outputs the output information to the outside of the computing device 1000 for use by a user.

The computing device 1000 may perform the steps in the foregoing communication method in this application.

The processor 1003 may be one or more central processing units (CPU). When a processor 601 or a processor 701 is a CPU, the CPU may be a single-core CPU or a multi-core CPU.

The memory 1004 may be but is not limited to one or more of a random access memory (RAM), a read-only memory (ROM), an erasable programmable read-only memory (EPROM), a compact disc read-only memory (CD-ROM), a hard disk, and the like. The memory 1004 is configured to store program code.

It may be understood that in the embodiments of the present invention, functions of any one or all of the first processing module to the seventh processing module provided in FIG. 6 to FIG. 9 may be implemented by using the central processing unit 1003 shown in FIG. 10.

All or some of the foregoing embodiments may be implemented by using software, hardware, firmware, or any combination thereof. When some or all of the foregoing embodiments are implemented in a form of a computer program product, the computer program product includes one or more computer instructions. When the computer program instructions are loaded or executed on a computer, all or some of the procedures or functions according to the embodiments of the present invention are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium, for example, the computer instructions may be transmitted from a website, computer, server, or data center to another website, computer, server, or data center wiredly (for example, a coaxial cable, an optical fiber, or a digital subscriber line (DSL)) or wirelessly (for example, infrared, radio, and microwave). The computer-readable storage medium may be any usable medium accessible by a computer, or a data storage device, such as a server or a data center, integrating one or more usable media. The usable medium may be a magnetic medium. (for example, a floppy disk, a hard disk, or a magnetic tape), an optical medium (for example, a DVD), a semiconductor medium (for example, a solid-state disk (SSD)), or the like.

The embodiments in this specification are all described in a progressive manner, for same or similar parts in the embodiments, refer to these embodiments. Each embodiment focuses on a difference from other embodiments. Especially, apparatus and system embodiments are basically similar to a method embodiment, and thereby are described briefly. For related parts, refer to descriptions in the method embodiment.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A communication method implemented by a network server, wherein the method comprises:
   obtaining a first connection relationship based on geographical location information of a plurality of base stations, wherein the first connection relationship is a connection relationship between the plurality of base stations;
   converting the first connection relationship into a second connection relationship based on a first correspondence, wherein the second connection relationship is a topological connection relationship between a plurality of network elements comprised in a bearer network, the first correspondence is a correspondence between geographical location information of one of the plurality of base stations and a network element identifier (ID) of one of the plurality of network elements connected to the one base station, and the plurality of base stations are respectively connected to the plurality of network elements in a one-to-one correspondence; and
   generating a service connection configuration of the bearer network based on the second connection relationship.

2. The communication method according to claim 1, wherein the converting the first connection relationship into the second connection relationship based on the first correspondence comprises:
   determining a third connection relationship based on a second correspondence and the first correspondence, wherein the second correspondence is a correspondence between the geographical location information of the plurality of base stations and ports of the plurality of network elements, and the third connection relationship is a connection relationship between the plurality of base stations and the plurality of network elements; and
   determining the second connection relationship based on the first connection relationship and the third connection relationship.

3. The communication method according to claim 2, wherein before the determining the third connection relationship, the method further comprises:
   presetting the second correspondence.

4. The communication method according to claim 2, wherein before the determining the third connection relationship, the method further comprises:
   determining the second correspondence if the network server determines, based on an internet protocol (IP) address of the one base station and an IP address of a port through which the one network element is connected to the one base station, that the one base station and the port through which the one network element is connected to the one base station are in a same local area network.

5. The communication method according to claim 1, wherein the generating the service connection configuration of the bearer network based on the second connection relationship comprises:
  generating, based on the second connection relationship, tunnel configuration information of a tunnel used to bear traffic between the plurality of base stations and/or route diffusion configuration information that is based on a tunnel configuration.

6. A network server, wherein the network server comprises:
  a memory;
  a processor communicated with the memory, configured to:
    obtain a first connection relationship based on geographical location information of a plurality of base stations, wherein the first connection relationship is a connection relationship between the plurality of base stations;
    convert the first connection relationship into a second connection relationship based on a first correspondence, wherein the second connection relationship is a topological connection relationship between a plurality of network elements comprised in a bearer network, the first correspondence is a correspondence between geographical location information of one of the base stations and a network element identifier (ID) of one of the plurality of network elements connected to the one base station, and the plurality of base stations are respectively connected to the plurality of network elements in a one-to-one correspondence; and
    generate a service connection configuration of the bearer network based on the second connection relationship.

7. The network server according to claim 6, wherein the processor is further configured to: determine a third connection relationship based on a second correspondence and the first correspondence, wherein the second correspondence is a correspondence between the geographical location information of the plurality of base stations and ports of the plurality of network elements, and the third connection relationship is a connection relationship between the plurality of base stations and the plurality of network elements; and
  determine the second connection relationship based on the first connection relationship and the third connection relationship.

8. The network server according to claim 7, wherein the processor further configured to:
  preset the second correspondence.

9. The network server according to claim 7, wherein the processor further configured to:
  determine the second correspondence if the processor determines, based on an internet protocol IP address of the one base station and an IP address of a port through which the one network element is connected to the one base station, that the one base station and the port through which the one network element is connected to the one base station are in a same local area network.

10. The network server according to claim 6, wherein the processor further configured to:
  generate, based on the second connection relationship, tunnel configuration information of a tunnel used to bear traffic between the plurality of base stations and/or route diffusion configuration information that is based on a tunnel configuration.

11. A non-transitory computer-readable storage medium, comprising an instruction, wherein when the instruction is run on a computer, the computer is enabled to:
  obtain a first connection relationship based on geographical location information of a plurality of base stations, wherein the first connection relationship is a connection relationship between the plurality of base stations;
  convert the first connection relationship into a second connection relationship based on a first correspondence, wherein the second connection relationship is a topological connection relationship between a plurality of network elements comprised in a bearer network, the first correspondence is a correspondence between geographical location information of one of the plurality of base stations and a network element identifier (ID) of one of the plurality of network elements connected to the one base station, and the plurality of base stations are respectively connected to the plurality of network elements in a one-to-one correspondence; and
  generate a service connection configuration of the bearer network based on the second connection relationship.

12. The non-transitory computer-readable storage medium according to claim 11, wherein the computer is further enabled to:
  determine a third connection relationship based on a second correspondence and the first correspondence, wherein the second correspondence is a correspondence between the geographical location information of the plurality of base stations and ports of the plurality of network elements, and the third connection relationship is a connection relationship between the plurality of base stations and the plurality of network elements; and
  determine the second connection relationship based on the first connection relationship and the third connection relationship.

13. The non-transitory computer-readable storage medium according to claim 12, wherein the computer is further enabled to:
  preset the second correspondence.

14. The non-transitory computer-readable storage medium according to claim 12, wherein the computer is further enabled to:
  determine the second correspondence if the computer determines, based on an internet protocol IP address of the base station and an IP address of a port through which the one network element is connected to the one base station, that the one base station and the port through which the one network element is connected to the one base station are in a same local area network.

15. The non-transitory computer-readable storage medium according to claim 11, wherein the computer is further enabled to:
  generate, based on the second connection relationship, tunnel configuration information of a tunnel used to bear traffic between the plurality of base stations and/or route diffusion configuration information that is based on a tunnel configuration.

* * * * *